United States Patent [19]
Yamashita

[11] Patent Number: 5,126,845
[45] Date of Patent: Jun. 30, 1992

[54] PIPELINE BUS HAVING REGISTERS AND SELECTOR FOR REAL-TIME VIDEO SIGNAL PROCESSING

[75] Inventor: Shinichi Yamashita, Sagamihara, Japan

[73] Assignee: Imagica Corp., Kyoto, Japan

[21] Appl. No.: 555,642

[22] Filed: Jul. 23, 1990

[30] Foreign Application Priority Data

Sep. 29, 1989 [JP] Japan .................................. 1-254333

[51] Int. Cl.⁵ .................. H04N 5/14; H04N 9/74; H04N 5/268
[52] U.S. Cl. ...................................... 358/160; 358/22; 358/181
[58] Field of Search ............... 358/160, 181, 183, 22, 358/148; 361/393, 392, 415; 364/254.4, 957.2, 245, 245.3, 929.5, 935.48, 970.5; 395/775

[56] References Cited

U.S. PATENT DOCUMENTS

| | | | |
|---|---|---|---|
| 4,218,709 | 8/1980 | Baxter et al. | 358/181 |
| 4,689,823 | 8/1987 | Wojcik et al. | 382/41 |
| 4,800,430 | 1/1989 | Murakami et al. | 358/160 |

OTHER PUBLICATIONS

Kazumasa Enami, "Real-Time Video Signal Processor", SMPTE Journal, Dec. 1987, pp. 1158-1165.

*Primary Examiner*—James J. Groody
*Assistant Examiner*—Safet Metjahic
*Attorney, Agent, or Firm*—Oblon, Spivak, McClelland, Maier and Neustadt

[57] ABSTRACT

A pipeline bus having a plurality of slots in a backplane for receiving functional modules. A bus line is connected between the slots. A register and a selector are provided between each two adjacent slots. An image signal and a sync signal are transmitted from upper to lower slots in synchronism with the clock signal. The selectors output a signal either from the register or from the associated functional module to the register which is downstream.

1 Claim, 5 Drawing Sheets

PIPELINE BUS HAVING REGISTERS AND SELECTOR FOR REAL-TIME VIDEO SIGNAL PROCESSING

BACKGROUND OF THE INVENTION

The present invention relates to a bus structure which enables various video signal processors to be divided into a plurality of function modules which in turn may be readily combined for video signal processing. The term "video signal processor" covers (i) an image memory for inputting and outputting a video signal at a video signal display speed and (ii) a unit capable of processing a video signal at a video signal display speed. The former is generally called a frame buffer and the latter, a video effector. These terms will be employed hereinafter.

In a video signal processor bus with divided functional modules, conventionally employed are (1) a system with a processor bus being used as a nucleus; and (2) a system with respective functional modules being interconnected as needs demand.

In the system (1), the processor bus includes address and data signals and writes and reads data through the data signal at an address addressed by the address signal. The system (1) is called in this specification a processor bus system a typical example of which is a frame buffer with peripheral devices around a video memory being arranged into a single module, which enables the memory capacity to be increased as needs demand by adding a further module or modules.

The system (2) has no concept of a bus. An actual circuit is straightforwardly functional-divided into functional modules which are interconnected with wiring as needs demand. Video effectors are of such construction. The system (2) is hereinafter called a no-bus system.

In the processor bus system, the video signal processor is functionally divided such that the processor plays a main roll, resulting in less flexibility as to addition of a new function or functions. For example, when an overlay function for displaying a picture plane through superimposition is required in an existing frame buffer, mere addition of a new functional module or modules is unsatisfactory to attain the task. It follows therefore that all of possibly required functions must be originally included in designing a processor bus type commercial frame buffer. This may mean that, when buying a frame buffer, a user pays a price which includes cost for some functions never used by the user. In addition, if the user wants a new additional function or functions, he/she must buy a new frame buffer.

Conversely, a no-bus system may readily receive a new functional module or modules. The system is however defective in versatility of respective functional modules for lack of the concept of the bus. For instance, incorporation of a functional module for a video effector into another video effector is next to impossible to do unless originally intendedly designed. It follows therefore that functional modules for no-bus systems are produced in more kinds and less quantity, which fact will cause video effectors to be generally very expensive.

The conventional systems have these demerits.

SUMMARY OF THE INVENTION

In view of the above, a primary object of the present invention is to provide a video signal pipeline bus which eliminates the defects of the conventional systems, which can provide flexible combinations of a plurality of functional modules according to use and which is readily responsive to future expansion.

The present invention will become more apparent from the following description of some preferred embodiments thereof taken in conjunction with the accompanying drawings.

DETAILED DESCRIPTION OF THE PREFERRED EMBODIMENTS

Figure 1:
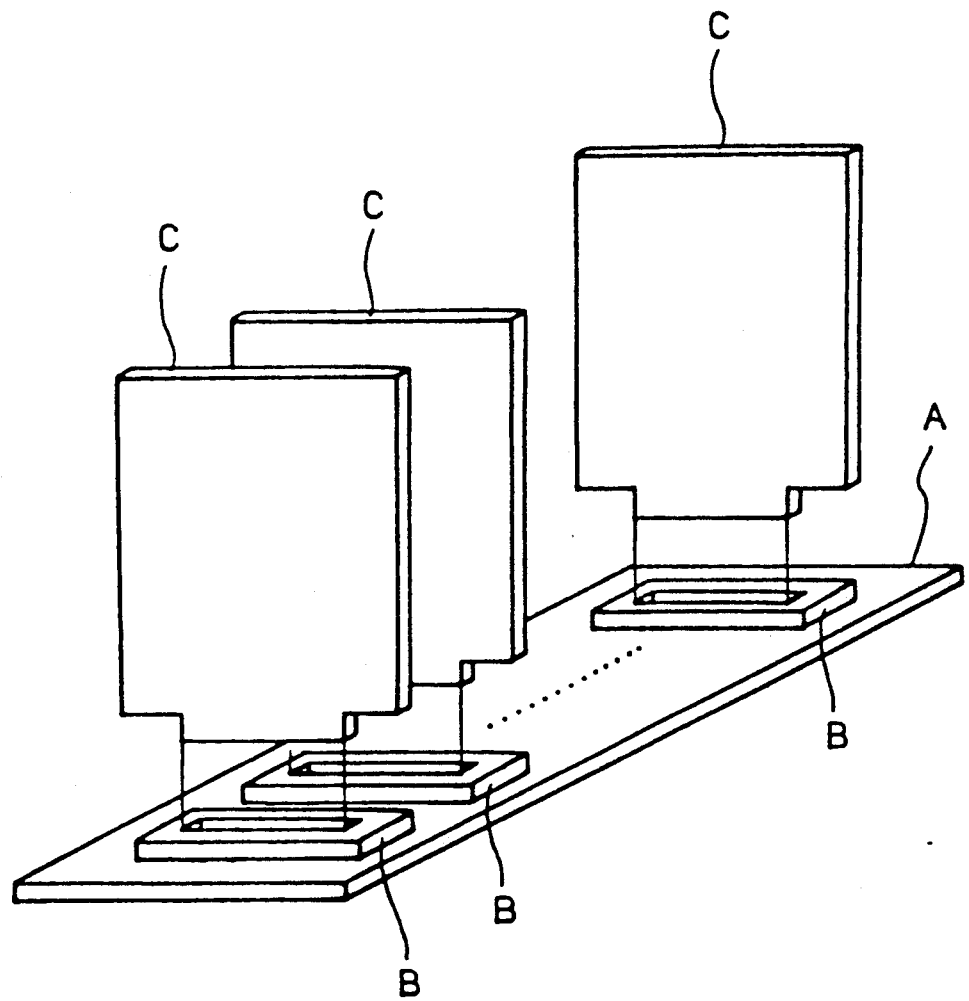
FIG. 1 is a view illustrating the concept of the present invention.
Figure 2:
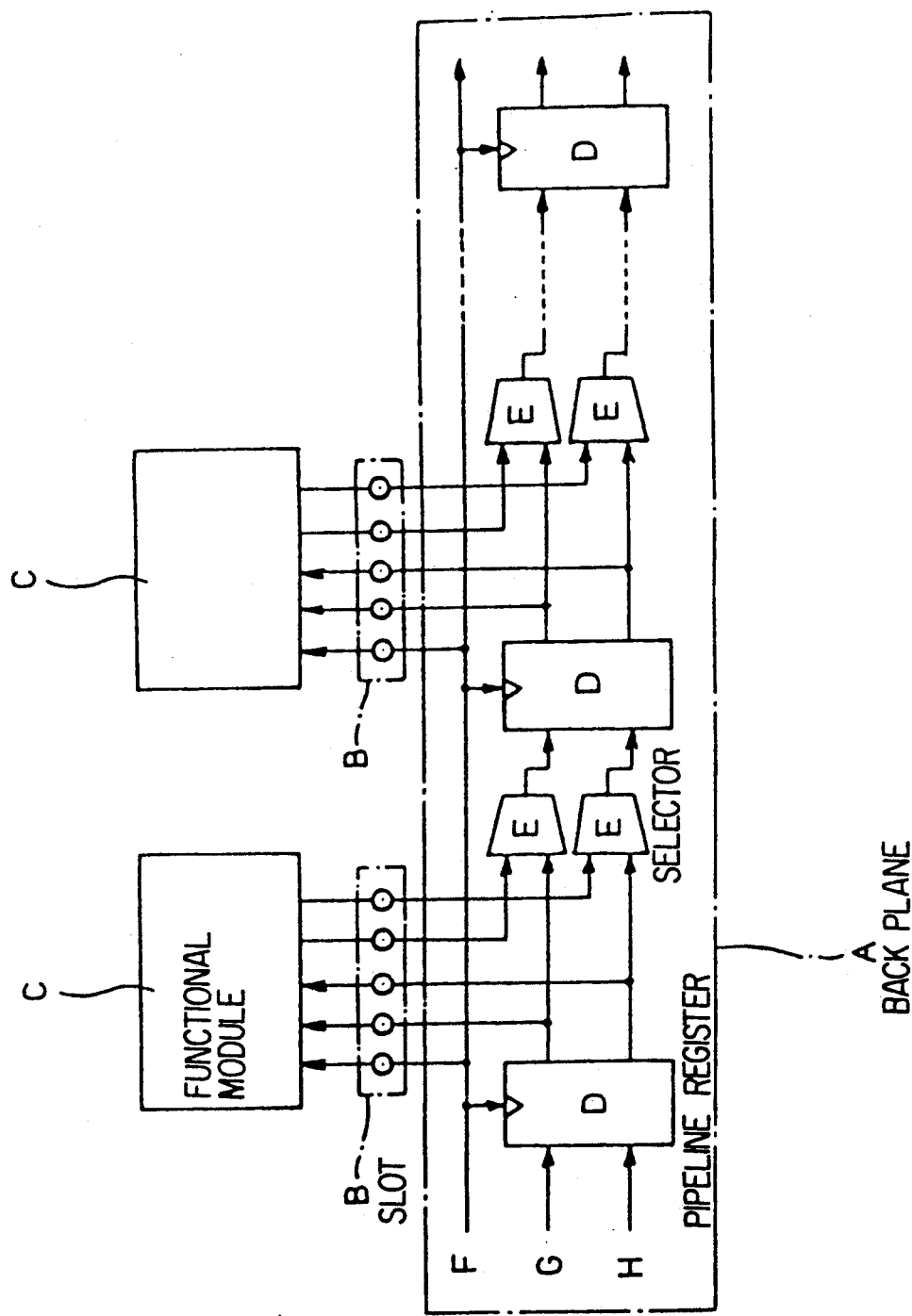
FIG. 2 is a block diagram thereof.

Referring first to FIGS. 1 and 2, the underlying principle of the present invention will be described.

A signal transmitted through a pipeline bus is a digitized video signal which flows at an actual display speed. In the pipeline bus, a signal is transmitted unidirectionally from upper to lower slots.

FIG. 1 illustrates the pipeline bus as a backplane A with a plurality of slots B. Pipeline registers D and selectors E exist between the adjacent slots. A video signal processor comprises the pipeline bus into slots of which various functional modules C are inserted.

The digitized video signal is transmitted from the upper to lower slots by the register D, which signal comprises an image signal G and a sync signal H. Of course, there is no problem even if the video signal includes some attributive information attendant to the image signal G as is the case with the FIGS. 3 or 4 embodiments to be described hereinafter. The register D transmits the signal in synchronism with a bus clock signal F which corresponds to an actual video display speed.

The picture plane displayed can be divided into small pixels and its image information is brightness in a black and white picture or a color in a color picture. The information converted into the electric signal is called an image signal. So far, the color information has been represented by dissolving the information into color-difference signals or represented by three primary colors (red, green and blue) of light. Representation of the color information is not limited to these. Furthermore, the image information of finer pixels which may become large in transmitted quantity may require a special transmission means, which is of course permissible in the present invention. Each functional module C must grasp at which position on the picture plane the image signal G corresponds to a pixel. For this purpose, in the pipeline bus, a reference position is transmitted to each functional module C by the sync signal H. Each functional module C computes, in response to the bus clock signal F and the sync signal H, at which position on the picture plane the image signal G at each time corresponds to a pixel.

In FIG. 2, the objects to be selected by the selectors E are the image and sync signals G and H; but as shown in the embodiments to be described below, some attribute information attendant to the image signal G and/or the bus clock signal F may be also an object to be selected.

The functional modules are classified into the following three types which are referred to as type I, II and III modules, respectively:

(I) a functional module which, during one cycle of the bus clock signal F, reads or writes the image signal from or into the pipeline bus or does nothing;

(II) a functional module which, during one cycle of the bus clock signal F, reads the image signal from the pipeline bus, carries out some process or processes and then writes the processed image signal into the pipeline bus; and (III) a functional module which generates the bus clock signal F, the sync signal H and the image signal G.

Termed the type I modules are, for example, an image memory module for a frame buffer and a video output module which converts a signal transmitted through the pipeline bus into a conventional video signal for delivery to the peripheral equipment. Action of the selector E to the type I module is such that the sync signal H from the upper slot is transmitted without being processed to the lower slot; as to the image signal G, when the signal G is to be written into the pipeline bus from the type I module, the output signal from the module is selected and in the other cases the image signal from the upper slot is selected.

Termed the type II modules are, for example, various arithmetic modules for a video effector. Arithmetic operation time in this kind of module is in general longer than the cycle of the bus clock signal F so that the sync signal H must be delayed for a time period required. That is, to the type II module, the selector E always selects the output derived from the module as the image signal. As to the sync signal H, the type II module receives the signal from the upper slot and outputs the same after delay for a desired time. The delayed output signal is then selected by the selector E and transmitted to the lower slot. The mode of operation of the type II module will be described in more detail in the embodiments.

The type III module generates the sync signal H and the bus clock signal F required by the pipeline bus. The module is inserted in general into the uppermost slot of the pipeline bus. Termed the type III modules are, for example, a video input module for receiving the video signal from the exterior to transmit the same into the pipeline bus as well as a background generation module.

In this case, the selector E neglects the signals transmitted from the upper slot and selects the sync and image signals generated by the type III module. Also as to the bus clock signal, the output from this module is written into the pipeline bus.

Figure 3:
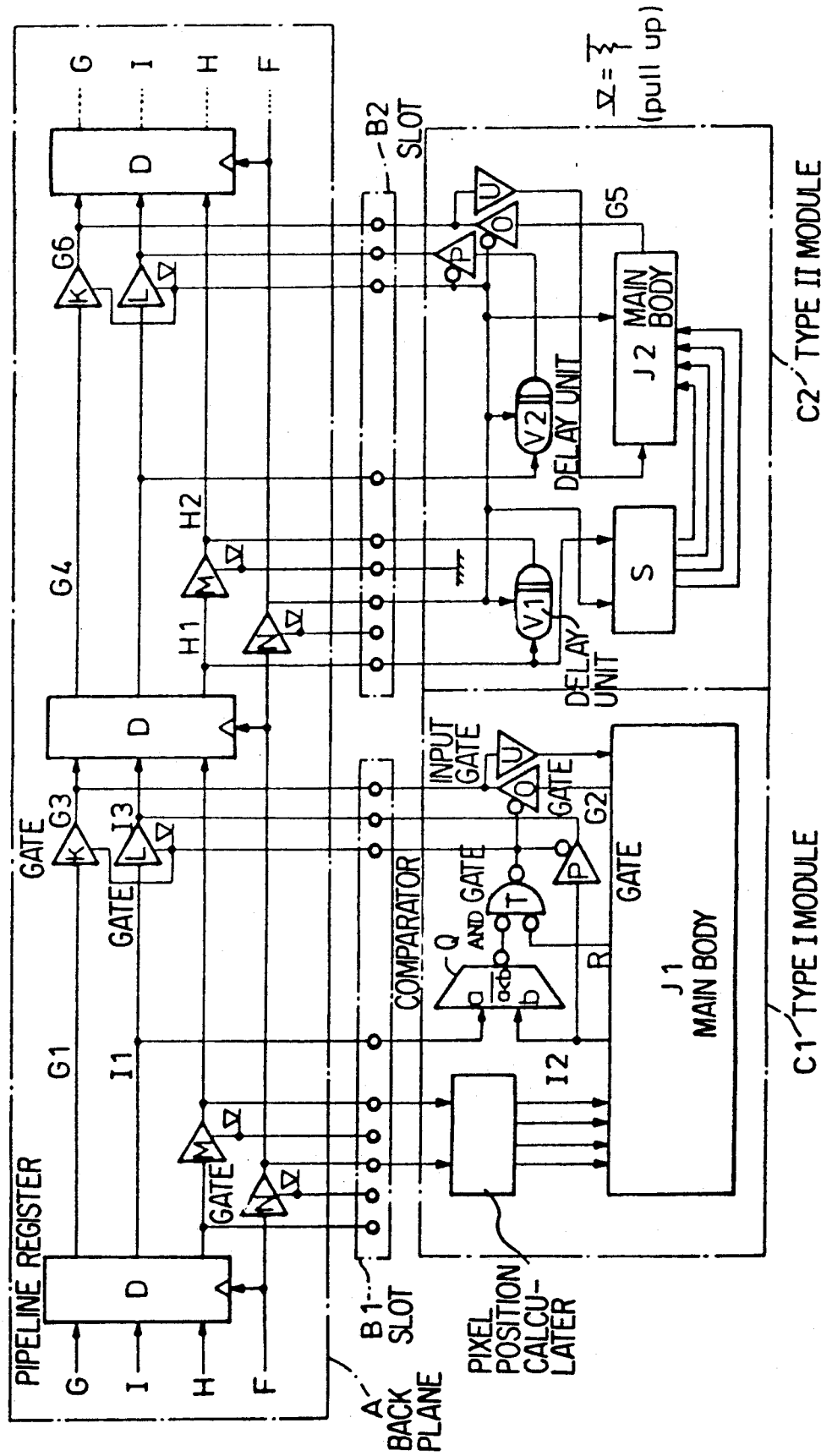
FIGS. 3 and 4 are circuit diagrams of preferred embodiments of the present invention.

Now referring to FIG. 3, a preferred embodiment of the present invention will be described in detail. FIG. 3 illustrates that type I and II modules C1 and C2 are inserted into the back plane A having two slots B1 and B2, respectively. Though only two slots are shown in FIG. 3, the number of the slots may be increased as needs demand. In comparison with FIG. 2, it is especially to be noted that the attribute information I attendant to the image signal G does exist and that the selectors E in FIG. 2 are replaced by the selectors comprising gates K, L and M on the back plane and gates O and P on the modules.

Here, the term "attribute information" represents the order of priority which is such that the type I module C1 having an inherent priority I2 can overwrite the image signal into the pipeline bus only when the priority I2 is higher than the attribute information I1 from the upper slot. In the following description, the attribute information and the order of priority have the same meaning.

First when the module C1 is not inserted into the slot B1, the gates K, L and M are on due to the pull-up effect so that the sync signal, the image signal and the attribute information from the upper slot are transmitted to the lower slot without being processed. That is, there is no problem even if an empty slot or slots remain on the back plane A.

Next insertion of the type I module C1 into the slot B1 will be described with the reference to the left half of FIG. 3.

Since the gate M remains "ON", the sync signal from the upper slot is transmitted to the lower slot without being processed. However, as to the image signal, selection is made between the image signal G1 from the upper slot and the output signal G2 from the module C1 in response to the output from an AND gate T. Similarly, as to the attribute information, selection is made between the attribute information I1 from the upper slot and the order of priority I2 of the module C1. A comparator Q compares the attribute information I1 from the upper slot with the order of priority I2 and, only when I2 is higher than I1, outputs a low level signal. A key signal R drops to a low level at a pixel into which the module C1 is to write the image signal. Only when both the output from the comparator Q and the key signal R are at a low level, the AND gate T is at the low level. That is, only when C1 has higher attribute information than that from the upper slot, the gates K and L are off while the gates O and P are on, resulting in the output from the module C1 being delivered to the pipeline bus; but in the other cases, the signal from the upper slot is transmitted to the lower slot without being processed.

The sync signal H and the bus clock signal F through the pipeline bus are inputted into an pixel position calculator S in the module C1 which determines at which position on the picture plane the image signal G through the pipeline bus at each time corresponds to a pixel and transmits the result to the main body J1 of the functional module. The main body J1 is a circuit for realizing the functions of the module C1. The key signal R and the output signal G2 are determined in response to the output of the calculator S.

When the module C1 has to read the image signal, the gate K is on and the gate O is off if the key signal R is maintained at a high level so that the image signal from the upper slot is transmitted to the input gate U. In this manner, the image signal can be read from the gate U.

Next the mode of operation of the type II module C2 will be described with the reference to the right half of FIG. 3.

The gate M, the input of which is clamped at a low level, is off. As a result, the sync signal H1 from the upper slot is once written into the module C2 and is delayed for a desired time period by a delay unit V1 and then returned to the pipeline bus as a sync signal H2. A delay set by the delay unit V1 is equal to a processing time period in the module main body J2 in order to make the phase of the image signal C coincident with that of the sync signal H. The main body J2 is a circuit for realizing the functions of the functional module C2. The attribute signal is delayed by the delay unit V2. In this embodiment, the type II module has no specific order of priority so that the attribute information corresponding to each pixel remains unchanged even after passing through the type II module C2.

Referring to the image signal, the gate K is on in the first half of the bus cycle and the gate O is on in the second half of the bus cycle since the bus clock signals are connected to the control inputs of the gates K and O. Here, the bus cycle means one cycle of bus clock signal F and is started when the data is latched by the pipeline register D which is an edge-triggered flip-flop which latches the data in synchronism with the rising edge of the bus clock signal. Latched by the pipeline register D and transmitted to the lower slot is the output signal G5 from the module C2; but during the first half of the bus cycle the image signal G4 from the upper slot is connected through the gate K to G6 so that the data which is read through the gate U during the first cycle of the bus cycle is the image signal G4 from the upper slot. That is, the type II module reads the image signal from the upper slot in the first half of the bus cycle and carries out the required process or processes in the main body J2 of the functional module and delivers the processed image signal during the second half of the bus cycle. The type II module also has a pixel position calculator S in order to control the process or processes carried out by the main body J2 of the functional module.

Figure 4:
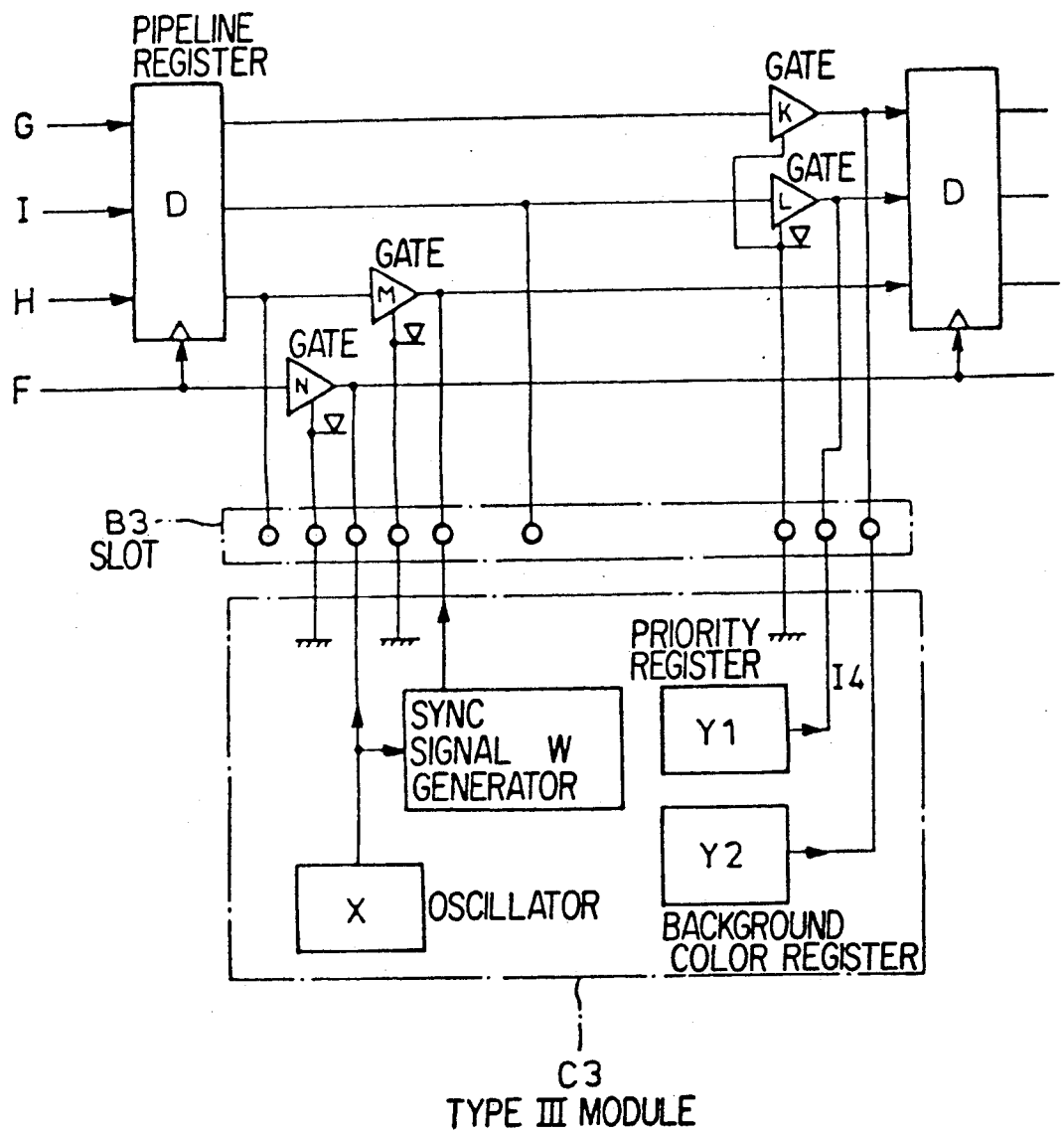

FIG. 4 shows an example of a circuit of the type III module C3 and more specifically shows a background image generation module which is connected to the pipeline bus through the slot B3. The background image generation module has an inherent priority I4 which is in general the lowest priority. Since the control inputs for the gates K, L, M and N are all clamped at a low level, these gates are all off. As a result, the module C3 generates all of the image signal G, the attribute information I, the sync signal H and the bus clock signal F. As to the bus clock signal, the output from an oscillator X is transmitted to the pipeline bus. A sync signal generator W divides the output from the oscillator X to generate a sync signal. Y1 denotes a priority register and Y2, a background color register. The background generation module, which is simple, can be mounted on the back plane.

Next, for clarification of the effects of the present invention, an example of a video signal processor with the system of the invention is shown. First various fundamental functional modules will be described.

A video input module, which is a kind of type III module, receives an exterior video signal and generates a bus clock signal, a sync signal and an image signal in response to the received video signal so as to transmit them into the pipeline bus. Depending on the kind of the exterior video signal, an A/D converter and/or a sync separation circuit may be needed.

A video output module is the type I module which always reads the image signal on the pipeline bus, and converts it into video signal for video output. Depending upon the kind of the fetched video signal, a D/A converter may be required. This functional module may be inserted into not only the lowest slot but also any suitable slot so that the image signal being transmitted through the pipeline bus is obtained at any suitable position, thereby fetching the image signal to the exterior.

An image memory module is a kind of type I module and has a memory for storing therein the image. Generally, it writes the contents of the memory into the pipeline bus to overwrite the image in the memory on the image signal transmitted from the upper slot. The image memory module also serves to read the image signal from the upper slot to store the same in the memory. The storage capacity can be increased when the position of outputting or writing the image signals on the pipeline bus are suitably displaced and a plurality of functional modules are used.

An image processing module is a kind of type II module and carries out various specific effects like a video effector. An image processing module may be constituted by combining two type I modules which are inserted into two adjacent slots. In this case, the image signal is read from the upper slot into which one of the type I module is being inserted; after processing the image signal, it is written back to the pipeline bus at the lower slot into which the other of the type I module is being inserted.

A delay correction module is a special type II module and delays the image signal from the upper slot for a predetermined time and then transmits it to the lower slot. The functional module is used to cancel any phase difference between input and output video signals since the time delay required for the video effector is often one frame time.

Figure 5:
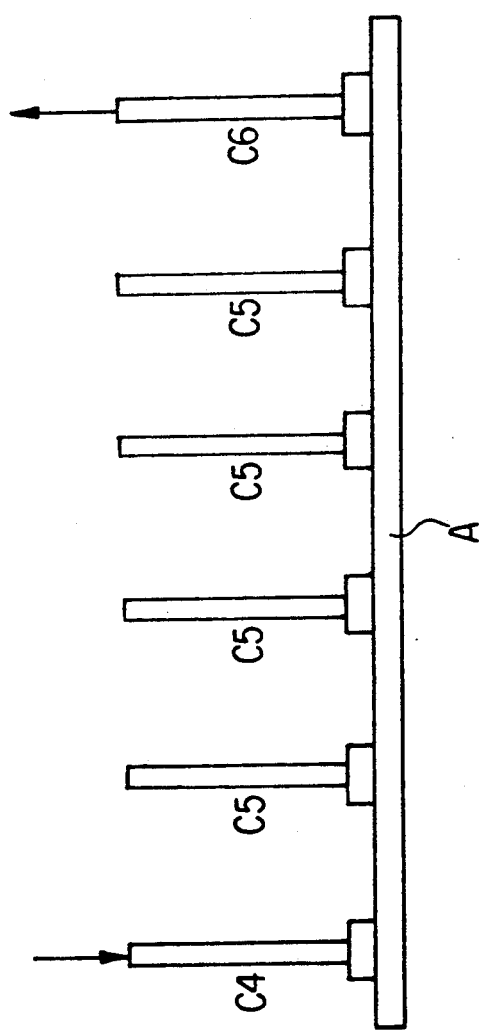
FIGS. 5 and 6 illustrate examples of installations each comprising the system of the present invention.

FIG. 5 illustrates an example of a frame buffer which comprises the system of the invention and is a side view of a plurality of functional modules being inserted into the back plane A. The video signal inputted through the video input module C4 in the upper slot is transmitted through the pipeline bus of the back plane A to be received by some portions of a plurality of the image memory modules C5. The received image signal is processed on the image memory and/or compositece with other image or images and fetched through the lowermost video output module C6. In an application of said frame buffer to for example a painting system, a plurality of image memory modules are utilized as divided functional windows for inputting, testing, menu, display of enlarged image or the like.

Figure 6:
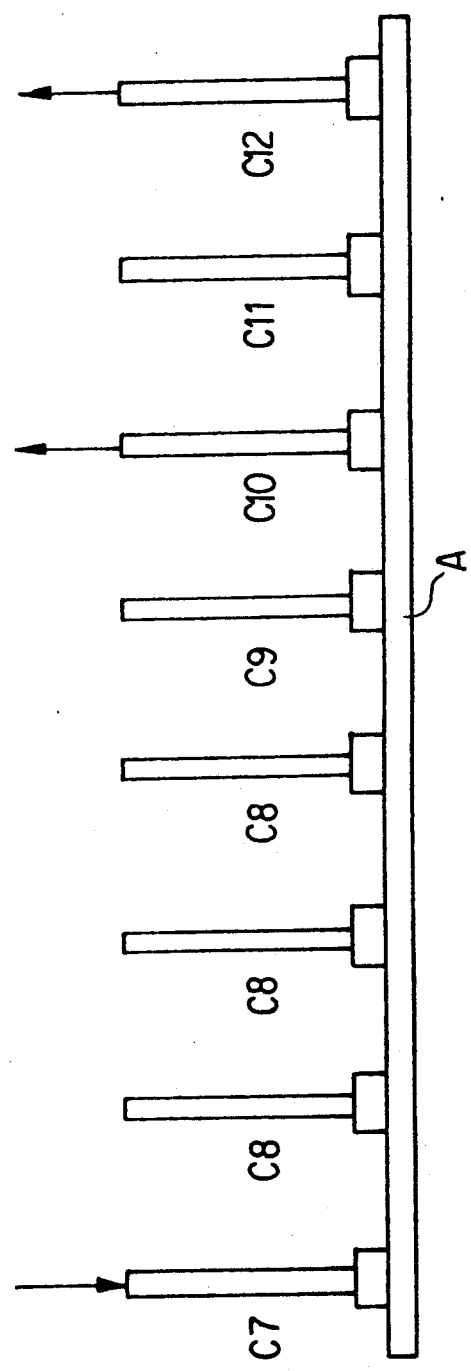

FIG. 6 illustrates an example of a video effector. The video signal inputted through a video input module C7 at the upper slot is subjected to various processes by a plurality of special effect modules C8. The processed signal is outputted as video signal at the video output module C10 after any delay resulting from the processes is cancelled by a delay correction module C9. In this embodiment, a picture memory module C11 and a video output module C12 are inserted downstream of the video output module C10. The video output module C12 is used to display the monitor image for an operator. The monitor image is the image obtained by superposing the output picture from the picture memory module C11 on the output image from the video output module C10 so as to superpose a menu or display of various parameters on the output image.

The present invention is not limited to the above described embodiments and various modifications may be effected without leaving the true spirit of the present invention. For instance, in the above described embodiments the selectors have been described to be mounted on the back plane, but it may be laid across the functional module and back plane. The bus structure in accordance with the present invention has various merits, which may be summarized as follows:

(1) A user can construct various systems by combining functional modules depending on his/her purposes.

(2) A user can add one or more functional modules at the time required so that the apparatus has expandability and economical merits.

(3) A user need not design the whole apparatus and can manufacture and sell merely functional modules in which he/she is skilled. As a result, he/she can newly enter a commercial market with a minimum capital.

(4) Even when a single manufacturer designs the whole apparatus, he/she can designs each functional module independently so that his/her allotted task can be carried out effectively.

(5) Participation of many manufacturers in designing functional modules will enhance possibility of manufacture and sales of functional modules which can satisfy various demands of users.

According to the present invention, a video signal processor can be assembled by a plurality of functionally divided modules. As compared with the prior art, a bus structure for video signal processors can be obtained which is more flexible in future addition or expansion of function. Pipeline registers are interposed between adjacent slot so that, as compared with conventional bus systems, the length of wiring is very short, whereby ensured is stable high speed operation with reliability even in any increase in number of slots on a back plane.

In addition, when the pixel position calculators are mounted on respective modules as shown in the embodiment shown in FIG. 3, signals required for a bus system are remarkably decreased, which fact is economically advantageous. Provision of such pixel position calculators for respective modules is especially advantageous in a video signal processor using a plurality of image memory processors with enlarging function since the enlargement ratio of each module can be determined independently. This is because each module can establish the one to one relationship between a pixel position and a memory address due to the position calculators.

What is claimed is:

1. A video signal pipeline bus, comprising:
   a backplane having a plurality of slots for receiving functional modules;
   a bus line mounted on said backplane and interconnecting said slots;
   a plurality of registers and a plurality of selectors connected to said bus line and mounted on said backplane, with one selector and one register being connected between adjacent slots on the bus line, each of said selectors receiving one input from the associated functional module and one input from the immediately preceding register and producing an output which is the input to the next register.

* * * * *